(12) United States Patent
Nakatani et al.

(10) Patent No.: US 7,336,426 B2
(45) Date of Patent: Feb. 26, 2008

(54) IMAGE PICKUP OPTICAL SYSTEM AND IMAGE PICKUP APPARATUS

(75) Inventors: Toru Nakatani, Uda (JP); Mamoru Terada, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/726,008

(22) Filed: Mar. 20, 2007

(65) Prior Publication Data

US 2007/0229966 A1 Oct. 4, 2007

(30) Foreign Application Priority Data

Mar. 28, 2006 (JP) ............................. 2006-087309

(51) Int. Cl.
*G02B 15/14* (2006.01)
*G02B 27/64* (2006.01)
(52) U.S. Cl. ...................................... 359/683; 359/557
(58) Field of Classification Search ................ 359/554, 359/557, 683

See application file for complete search history.

(56) References Cited

U.S. PATENT DOCUMENTS 5,933,281 A * 8/1999 Suzuki ........................ 359/676

FOREIGN PATENT DOCUMENTS

JP          10-90601 A       4/1998
JP       2002-107625 A       4/2002

* cited by examiner

*Primary Examiner*—Scott J. Sugarman
(74) *Attorney, Agent, or Firm*—Sidley Austin LLP

(57) ABSTRACT

An image pickup optical system according to the present invention is provided for forming a light flux from an object into an optical image on an image pickup element. The image pickup optical system includes: a first lens group having a positive power; a second lens group having a negative power; a third lens group having a positive power; a fourth lens group having a negative power; and a fifth lens group. A distance between each neighboring lens groups changes with the fourth lens group statically positioned, for varying power of the image pickup optical system. The fourth lens group moves in a direction substantially perpendicular to an optical axis for shake compensation. The image pickup optical system fulfills the predetermined conditional formulas according to focal lengths of the first and fourth lens groups.

6 Claims, 14 Drawing Sheets

IMAGE PICKUP OPTICAL SYSTEM AND IMAGE PICKUP APPARATUS

This application is based on Japanese Patent Application No. 2006-087309 filed on Mar. 28, 2006, in Japanese Patent Office, the entire content of which is hereby incorporated by reference.

TECHNICAL FIELD

The present invention relates to an image pickup optical system and an image pickup apparatus, which is capable of varying power for picking-up an image and of performing shake compensation of the image to be picked-up.

BACKGROUND

In recent years, as personal computers have widely spread over, digital cameras capable of easily inputting picked-up images in the digital cameras to the personal computers have gained popularity. Further, it becomes general that a digital camera is installed into an information processing apparatus, such as, a mobile computer, a cellular phone and a PDA (Personal Digital Assistance). As the digital camera gains popularity, a smaller digital camera is demanded. When the size of a camera becomes small, vibration accidentally transmits to the image pickup optical system of the camera and image-shake occurs. Accordingly, various zoom lenses having anti-shake mechanism for performing the shake compensation have been proposed. For example, Japanese Patent Applications Open to Public Inspection Nos. H10-90601 and 2002-107625 disclose a zoom lens of five lens groups having positive power, negative power, positive power, negative power and positive power in the order from the object side, in which all lenses of the fourth lens group having negative power or a plurality of lenses in the fourth lens group is arranged to shift in the direction, which is substantially perpendicular to the optical axis of the lenses in order to conduct shake compensation.

However, the zoom lens for shake compensation disclosed in Japanese Patent Applications Open to Public Inspection Nos. H10-90601 and 2002-107625, includes a lens group which is designed to shift in the direction substantially perpendicular to the optical axis of the lens to conduct the shake compensation and which is configured to also move along the optical axis to vary its power. As a result, the structure of anti-shake mechanism becomes complex and a zoom lens barrel becomes large.

SUMMARY

Therefore, an object of the present invention is to provide an image pickup optical system and an image pickup apparatus having a mechanical structure including a small and simple anti-shake mechanism, and a small-sized zoom lens barrel. Another object of the present invention is to provide an image pickup optical system and an image pickup apparatus in which aberrations are well corrected with providing a higher variable power zoom lens.

An image pickup optical system according to the present invention includes: a first lens group having a positive power; a second lens group having a negative power; a third lens group having a positive power; a fourth lens group having a negative power; and a fifth lens group. In the image pickup optical system, a distance between each neighboring lens groups among the first to fifth lens groups changes with the fourth lens group positioned at a fixed distance to an image surface of the image pickup optical system, for varying power of the image pickup optical system from a wide-angle end to a telephoto end. Further, in the image pickup optical system, the fourth lens group moves in a direction substantially perpendicular to an optical axis for a shake compensation. Further, in the image pickup optical system, respective powers of the first lens group and the fourth lens group are set in proper ranges. Therefore, it provides a mechanical structure including a small and simple anti-shake mechanism and provides a zoom lens with a high variable power. It further provides an image pickup optical system and image pickup apparatus, in which aberrations are properly corrected.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE PREFERRED EMBODIMENT

An embodiment of the present invention will be described by referring to drawings hereinafter. While the preferred embodiments of the present invention have been described using specific terms, such description is for illustrative purposes only, and it is to be understood that changes and variations may be made without departing from the spirit or scope of the appended claims.

Figure 1:
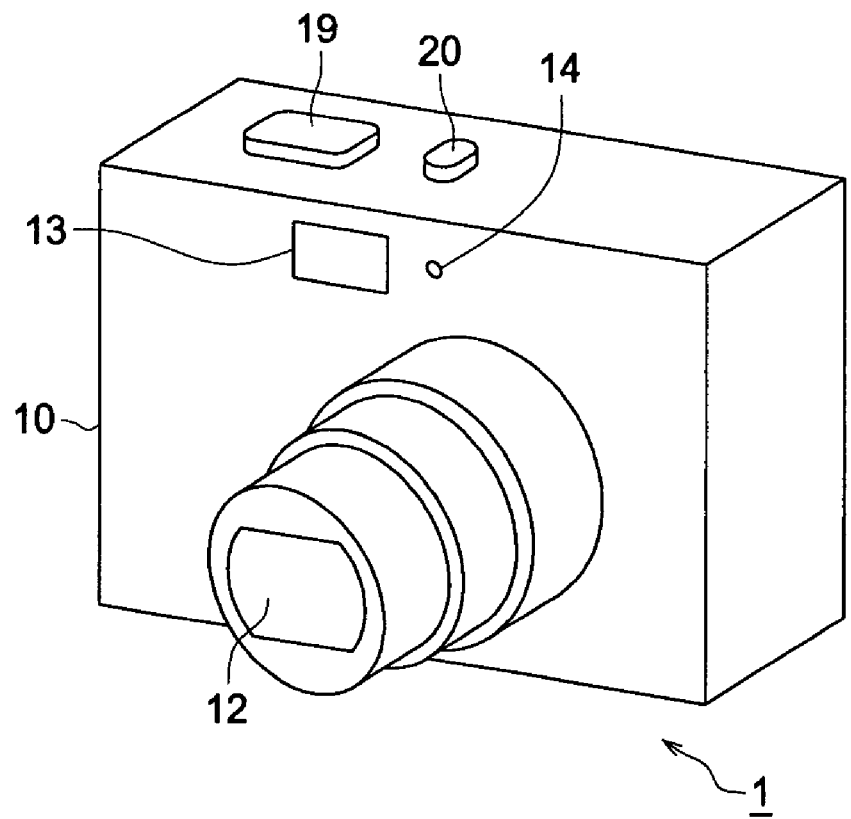
FIG. 1(a) illustrates a perspective view of an exterior of an embodiment of a digital camera and FIG. 1(b) illustrates a rear side view of an embodiment of the digital camera.
Figure 1:
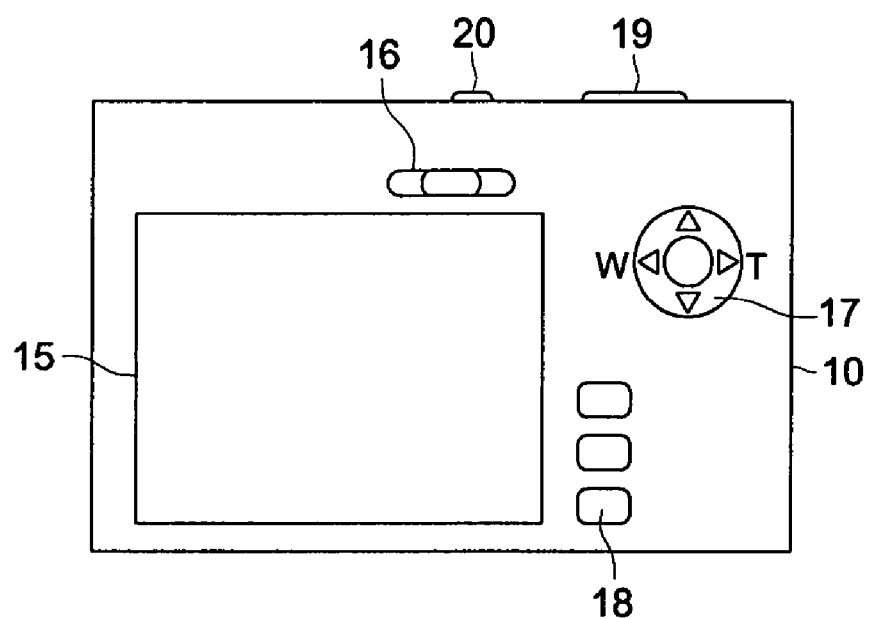

FIG. 1 illustrates a perspective view of an exterior of an embodiment of a digital camera. FIG. 1(a) illustrates a perspective view of the digital camera and FIG. 1(b) illustrates the rear surface view of the embodiment of the digital camera.

As illustrated in FIG. 1(a), a digital camera 1 includes an image pickup optical system 12, a flashlight emitting section 13 and a self-timer lamp 14 on the front surface, a release button 19 and a power switch button 20 on the top surface. As illustrated in FIG. 1(b), the digital camera 1 also includes a display section 15, a mode-set switch 16, a cross-shaped key 17 and a plurality of operation keys 18 on the rear surface.

The image pickup optical system 12 comes out from the front surface of a camera body 10 when image is picked-up, and retracts to be installed in the camera body 10 when carrying the digital camera without photographing. A flashlight emitting section 13 emits flashlights for irradiating a photographic object. The self-timer lamp 14 is a lamp for indicating that a photographic operation using a self-timer is proceeding.

The display section 15 includes a liquid crystal display. The display section 15 displays setting status of the digital camera 1 and information such as various operation guides, in addition to the images, which have been picked-up. The mode switch 16 is a slide switch, which is used for setting an operation mode of the digital camera 1. The cross-shaped key 17 has four contacts in up/down and left and right positions. The cross-shaped key 17 is used for moving a cursor displayed on the display section 15. The image pickup optical system 12 includes a zoom lens, and the cross-shaped key 17 is also used for adjusting the focal length of the zoom lens. The operation key 18 is used for switching the items displayed on the display section 15, selecting the item displayed on the display section 15, and setting the function of the digital camera 1. The release button 19 operates in a two-step action to direct the pickup preparation of the image to be recorded and pickup of the image to be recorded.

Figure 2:
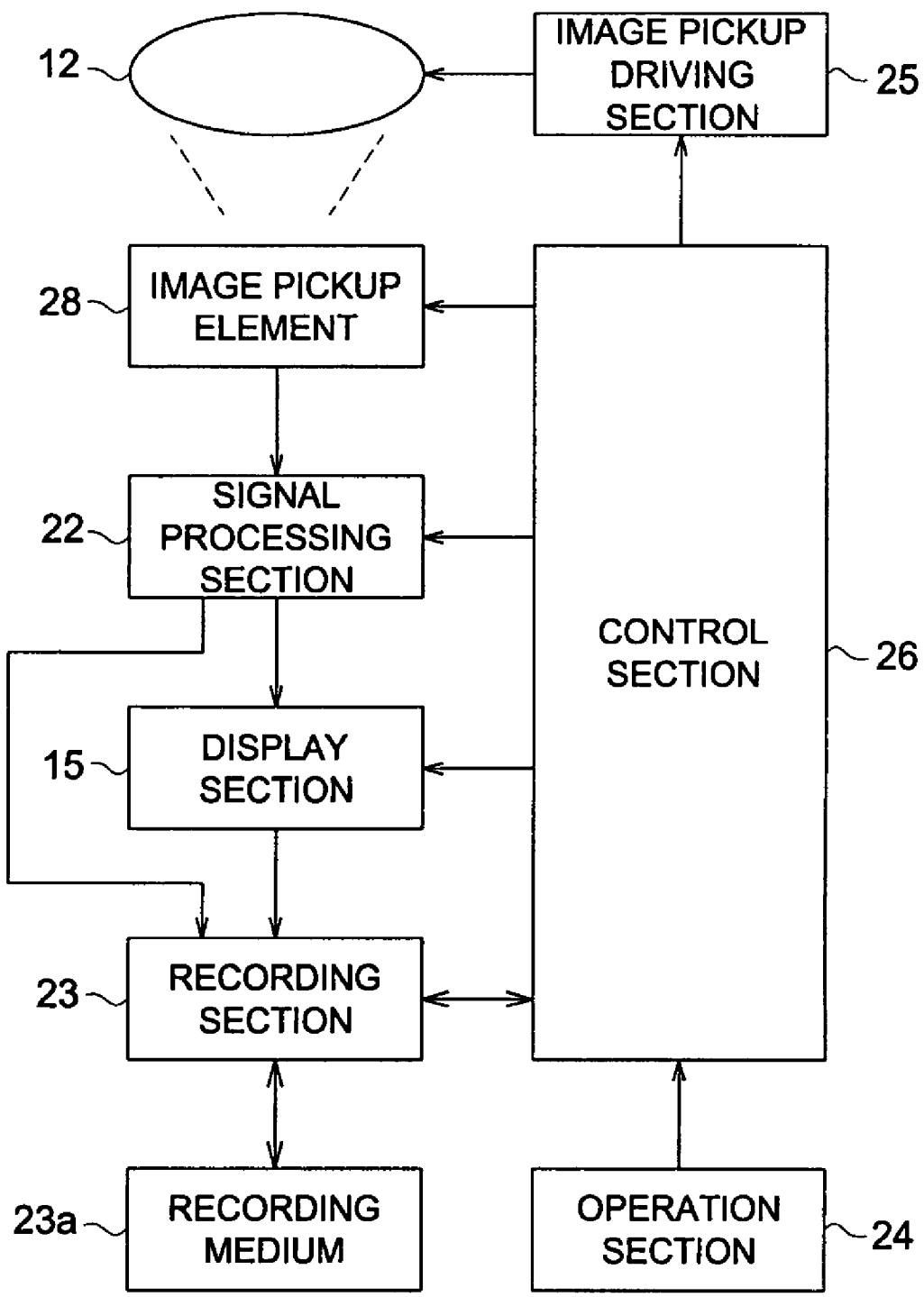
FIG. 2 illustrates a block diagram of each embodiment of the digital camera configuration.

FIG. 2 illustrates a block diagram of an electrical structure of the digital camera 1. The digital camera 1 includes an image pickup element 28, a signal processing section 22, a recording section 23, an operation section 24, an image pickup optical system driving section 25 and a control section 26 in addition to the image pickup optical system 12 and the display section 15. The image pickup element 28 is a CCD area sensor for each outputting signal representing the quantity of received light per a pixel of the CCD. The signal processing section 22 processes the output signal of the image pickup element 28 and generates image data of the image, which has been picked-up. The recording section 23 records the image data, which has been generated by the signal processing section 22 onto a recording medium 23a, which is capable of freely attaching to and removing from the digital camera 1, and the recording section 23 reads the image data from the recoding section 23 to reproduce and display the image. The operation section 24 is a general term of the group of a mode set switch 16, the cross-key 17, the operation key 18 and power switch button 20, which transmits the signal related to the user's operation to the control section 26.

The image pickup optical system driving section 25 drives and controls devices such as a zooming motor; a focusing motor; a shutter and diaphragm motor for adjusting exposure; a retracting motor; and an anti-shaking mechanism driving actuator. The control section 26 controls each section corresponding to the direction given through the operation section 24.

Next, the configuration of the image pickup optical system 12 will be described.

Figure 3:
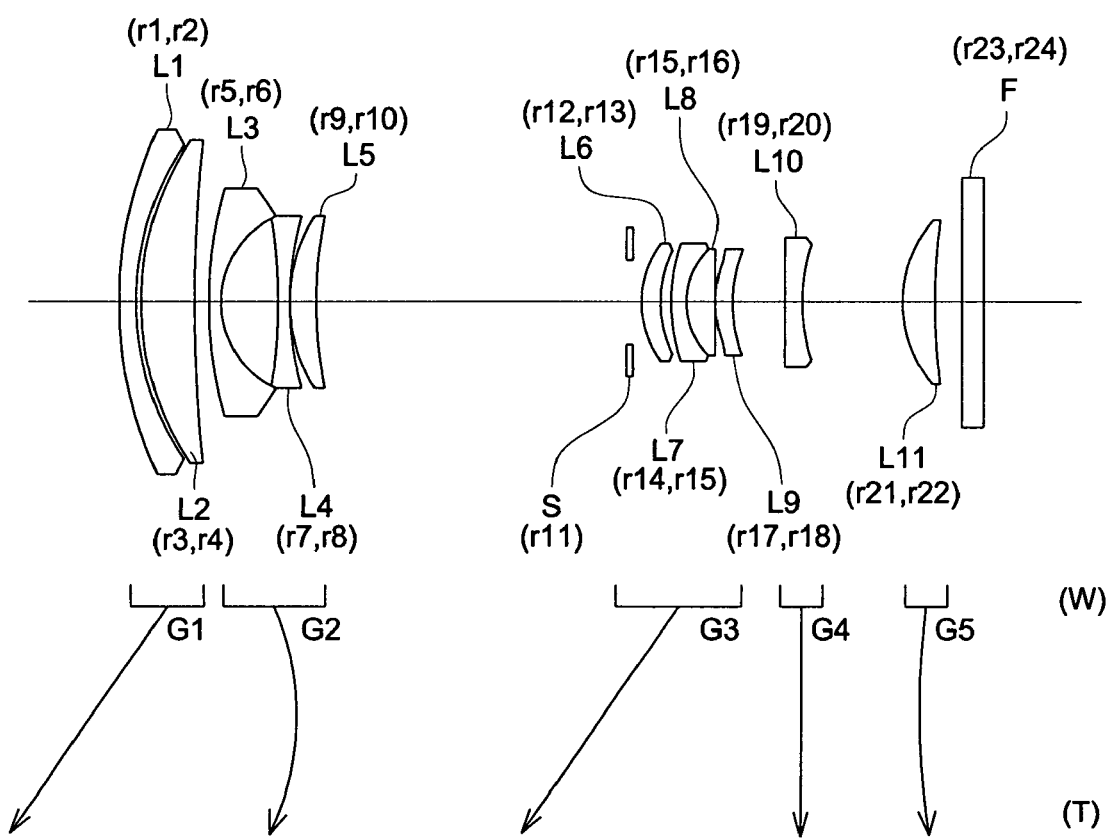
FIG. 3 illustrates the structure of an image pickup optical system in the first embodiment.
Figure 4:
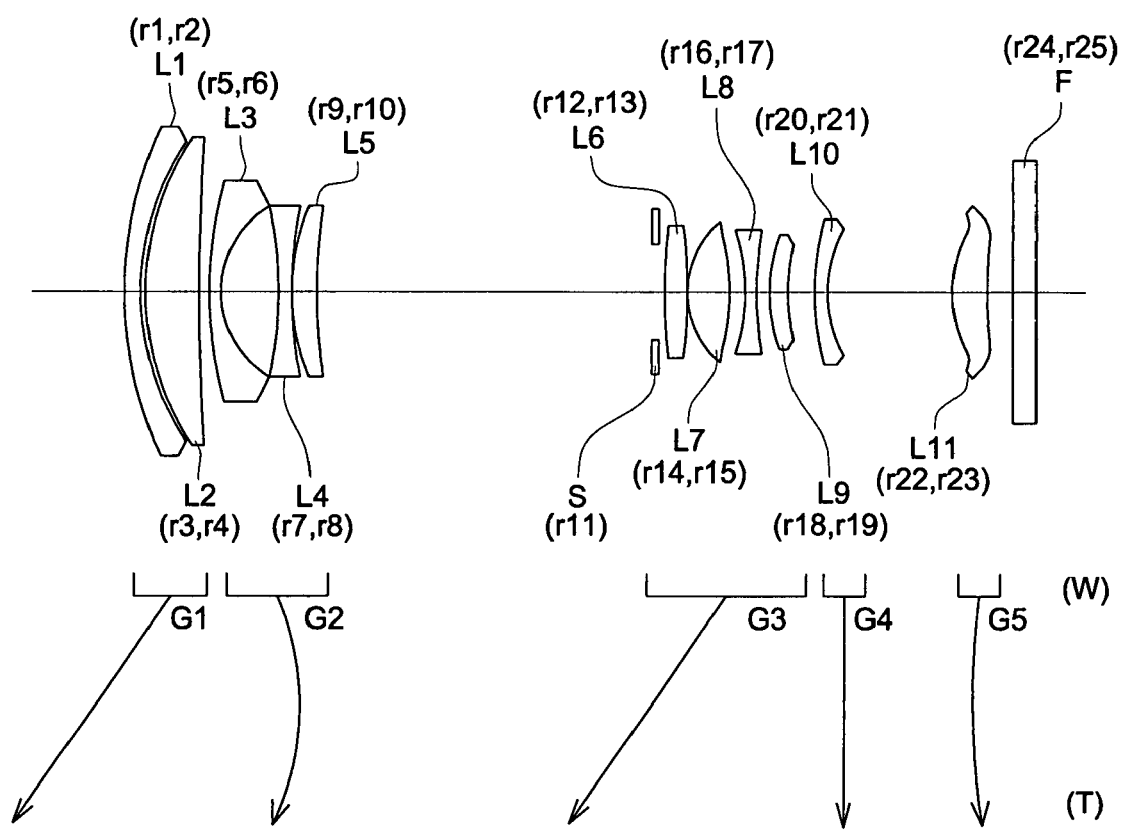
FIG. 4 illustrates the structure of an image pickup optical system in the second embodiment.
Figure 5:
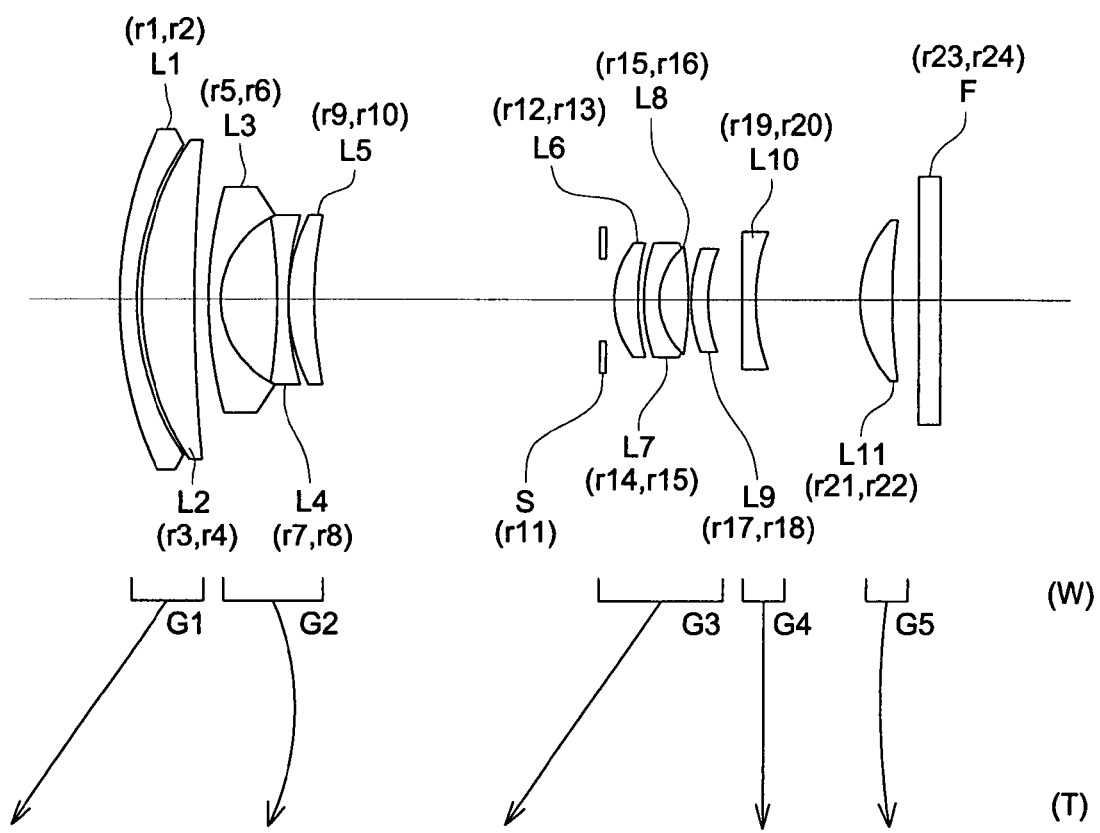
FIG. 5 illustrates the structure of an image pickup optical system in the third embodiment.

FIGS. 3 to 5 illustrate the image pickup optical systems of the first to the third embodiments, each of which focuses to infinity with a focal length at the wide-angle end. The arrows illustrated in the each figure denote the position of each lens group when zooming (varying power). The original point of the arrow denotes the lens group position when the image pickup optical system focuses to infinity with a focal length at a wide-angle end (W), and the front end of the arrow corresponds to the lens group position when the image pickup optical system focuses to infinity with a focal length at a telephoto end (T).

FIG. 3 illustrates the first embodiment of the present invention. The image pickup optical system illustrated in FIG. 3 includes, in the order from the object side, a first lens group G1 having positive power, a second lens group having negative power, a diaphragm S, a third lens group G3 having positive power, a fourth lens group G4 having negative power and a fifth lens group G5 having positive power. A parallel-flat plate, which is equivalent to a low pass filter and a cover glass, is located in the object side of the image pickup optical system. Here "power" denotes a quantity defined by the reciprocal of a focal length.

The first lens group includes, in the order from object side, a negative lens L1 having meniscus shape whose convex surface faces the object side and a positive lens L2 having meniscus shape whose convex surface faces the object side.

The second lens group G2 includes, in the order from object side, a negative lens L3 having meniscus shape whose convex surface faces the object side, a negative lens L4 having biconcave shape, and a positive lens L5 having meniscus shape whose convex surface faces the object side.

The third lens group G3, in the order from the object side, a positive lens L6 having meniscus shape whose convex surface faces the object side, a negative lens L7 having meniscus shape whose convex surface faces the object side, a positive lens L8 having biconvex shape, which is cemented to the negative lens L7, and a positive lens L9 having meniscus shape whose convex surface faces the object side and having aspherical surfaces in both the surfaces.

The fourth lens group G4 includes a negative lens L10 having biconcave shape and an aspherical surface facing the image side.

The fifth lens group G5 includes a positive lens L11 having meniscus shape whose convex surface faces the object side and having an aspherical surface facing the object side.

When zooming (varying power) from the wide-angle end to the telephoto end, the first lens group G1 moves to the object side, the second lens group G2 makes u-turn and moves to the image side, the third lens group G3 moves to the object side, the fourth lens group G4 is fixed against the image surface, and the fifth lens group G5 moves to the object side and further moves to the image side from the middle focal length between the wide-angle end and the telephoto end.

In order to compensate the shake caused by the vibration of the image pickup optical system, the negative lens L10 of the fourth lens group G4 is moved in the direction substantially perpendicular to the optical axis.

FIG. 4 illustrates the second embodiment of the present invention. The image pickup optical system illustrated in FIG. 4 includes, in the order from the object side, a first lens group G1 having positive power, a second lens group having negative power, a diaphragm S, a third lens group G3 having positive power, a fourth lens group G4 having negative power and a fifth lens group G5 having positive power. A parallel-flat plate, which is equivalent to a low pass filter and a cover glass, is located in the object side of the image pickup optical system.

The first lens group includes, in the order from object side, a negative lens L1 having meniscus shape whose convex surface faces the object side and a positive lens L2 having meniscus shape whose convex surface faces the object side.

The second lens group G2 includes, in the order from object side, a negative lens L3 having meniscus shape whose convex surface faces the object side, a negative lens L4 having biconcave shape and a positive lens L5 having meniscus shape whose convex surface faces the object side.

The third lens group G3 includes, in the order from the object side, a positive lens L6 having biconvex shape, a positive lens L7 having biconvex shape, a negative lens L8 having biconcave shape and a positive lens L9 having meniscus shape whose convex surface faces the object side and having aspherical surfaces in the both surfaces.

The fourth lens group L4 includes a negative lens L10 having meniscus shape whose convex surface faces the object side and having aspherical surfaces in the both surfaces.

The fifth lens group L5 includes a positive lens L11 having meniscus shape whose convex surface faces the object side and having aspherical surfaces in the both surfaces.

When zooming from the wide-angle end to the telephoto end, the first lens group G1 moves to the object side, the second lens group G2 makes u-turn and moves to the image side, the third lens group G3 moves to the object side, the fourth lens group G4 is fixed against the image surface, and the fifth lens group G5 moves to the object side and further moves to the image side from the middle focal length between the wide-angle end and the telephoto end.

In order to compensate the shake caused by the vibration of the image pickup optical system, the negative lens L10 of the fourth lens group G4 is moved in the direction substantially perpendicular to the optical axis.

FIG. 5 illustrates the third embodiment of the present invention. The image pickup optical system illustrated in FIG. 5 includes, in the order from the object side, a first lens group G1 having positive power, a second lens group having negative power, a diaphragm S, a third lens group G3 having positive power, a fourth lens group G4 having negative power and a fifth lens group G5 having positive power. A parallel-flat plate, which is equivalent to a low pass filter and a cover glass, is located in the object side of the image pickup optical system.

The first lens group includes, in the order from object side, a negative lens L1 having meniscus shape whose convex surface faces the object side and a positive lens L2 having meniscus shape whose convex surface faces the object side.

The second lens group G2 includes, in the order from the object side, a negative lens L3 having meniscus shape whose convex surface faces the object side, a negative lens L4 having biconcave shape and a negative lens L5 having meniscus shape whose convex surface faces the object side.

The third lens group G3, in the order from the object side, a positive lens L6 having meniscus shape including the convex surface facing the object side, a negative lens L7 having meniscus shape whose convex surface faces the object side, a positive lens L8 having biconvex shape, which is cemented to the negative lens L7, and a positive lens L9 having meniscus shape whose convex surface faces the object side and having aspherical surfaces in both the surfaces.

The fourth lens group G4 includes a negative lens L10 having meniscus shape whose convex surface faces the object side and having an aspherical surface of the image side surface.

The fifth lens group G5 includes a positive lens L11 having meniscus shape whose convex surface faces the object side and having an aspherical surface of the image side surface.

When zooming from the wide-angle end to the telephoto end, the first lens group G1 moves to the object side, the second lens group G2 makes u-turn and moves to the image side, the third lens group G3 moves to the object side, the fourth lens group G4 is fixed against the image surface, and the fifth lens group G5 moves to the object side and further moves to the image side from the middle focal length between the wide-angle end and the telephoto end.

In order to compensate the shake caused by the vibration of the image pickup optical system, the negative lens L10 of the fourth lens group G4 is moved in the direction substantially perpendicular to the optical axis.

Each of the respective embodiments described above includes, in the order from the object side, a first lens group having positive power, a second lens group having negative power, a third lens group having positive power, a fourth lens group having negative power and a fifth lens group. The fourth lens group is configured so that when varying power of the image pickup optical system from the wide-angle end to the telephoto end, the distance between each neighboring lens groups among the first to fifth lens groups changes with the fourth lens group positioned at a fixed distance to an image surface of the image pickup optical system. The fourth lens group is further configured so that when conducting a shake compensation, the fourth lens group moves in the direction substantially perpendicular to the optical axis.

This configuration described above provides a small sized zoom lens having high variable power. Further, the fourth lens group which is positioned statically for varying the power is used to conduct the shake compensation. Therefore, it reduces the size and weight of the image pickup optical system, and achieves a small sized anti-shake mechanism and a small sized barrel.

The structure of the image pickup optical system of each embodiment satisfies a following formula.

$$6 < f1/fw < 20 \quad (1)$$

Where f1 denotes the focal length of the first lens group and fw denotes the focal length of the entire of the image pickup optical system at the wide-angle end.

The formula (1) defines the appropriate range of the power of the first lens group against the focal length of the image pickup optical system at the wide-and end. When the value of f1/fw is more than the lower limit, the power of the first lens group does not become too strong and the occurrence of aberration becomes low. Particularly, when field curvature and distortion occur on a large scale, in order to correct these aberrations in excellent condition, the additional lens or the additional aspherical surface is required. However, by setting the value of f1/fw more than the lower limit, the image pickup optical system can be minimized and the manufacturing cost can be lower. Further, the value of f1/fw becomes lower than the upper limit, the power of the first lens group does not become too weak, and the outer diameter of the first lens can be set small. Accordingly, the image pickup optical system can be minimized.

It is more preferable that the image pickup optical system satisfies the following formula (1') instead of the formula (1).

$$7 < f1/fw < 15 \tag{1'}$$

Further, the image pickup optical system of each embodiment satisfies the following formula (2).

$$-0.7 < f4/ft < -0.2 \tag{2}$$

Where f4 denotes the focal length of the fourth lens group and ft denotes the focal length of the entire of the image pickup optical system at the telephoto end.

The formula (2) is a formula for defining an appropriate power of the fourth lens group for conducting shake compensation against the focal length of the entire of the image pickup optical system at the telephoto end.

When the value of f4/ft is more than the lower limit, the power of the fourth lens group is not too weak and the amount of decentering, for which the fourth lens group moves for the shake compensation in the direction substantially perpendicular to the optical axis to conduct the shake compensation, can be small. As a result, the anti-shake mechanism can be minimized. When the value of f4/ft is lower than the upper limit, the power of the fourth lens group is not too weak. Therefore, when moving the fourth lens group in the direction substantially perpendicular to the optical axis (decentering movement) for the shake compensation, the rotationally asymmetric aberration around the optical axis occurs in a small amount. It secures an excellent anti-shake capacity of the image pickup optical system.

It is more preferable that the image pickup optical system satisfies the following formula (2') instead of the formula (2).

$$-0.6 < f4/ft < -0.25 \tag{2'}$$

The image pickup optical system of each embodiment further satisfies the following formula (3), which is preferable.

$$-1 \times 10^{-2} < (N'-N) \times (X(H) - X0(H))/f4 < 0 \tag{3}$$

Where, in the lens having an aspherical surface in the fourth lens group, N denotes a refractive index for the d-line of the material in the object side of the aspherical surface, N' denotes the refractive index for the d-line of the material in the image side of the aspherical surface, H denotes the height (a ray-height) at which an axial marginal ray passes through on the aspherical surface at the telephoto end, X(H) denotes the displacement of the aspherical surface in the optical axis direction at the ray-height H on the aspherical surface, and X0(H) denotes the displacement of a reference spherical surface of the aspherical surface in the optical axis direction at the ray-height H on the reference spherical surface. Here, the reference spherical surface denotes a spherical surface having a surface vertex at the same position to the aspherical surface and having the same curvature radius to the paraxial curvature-radius of the aspherical surface, and the displacement in a direction to the image surface is represented by a positive value.

The formula (3) appropriately defines the aspherical surface shape of the aspherical lens in the fourth lens group to appropriately suppress the occurrence of the aberration caused by the decentering when conducting shake compensation by using one lens. When the value of $(N'-N) \times (X(H)-X0(H))/f4$ is more than the lower limit, the spherical aberration occurred in the fourth lens group can be compensated enough. It prevents the axial coma caused by decentering for shake compensation, from increasing. As a result, the excellent anti-shake performance can be obtained. When the value of $(N'-N) \times (X(H)-X0(H))/f4$ is lower than the upper limit, the amount of compensation of the spherical aberration does not become too much and the excellent anti-shake performance can be obtained.

It is more preferable that the image pickup optical system satisfies the following formula (3') instead of the formula (3).

$$-1 \times 10^{-3} < (N'-N) \times (X(H) - X0(H))/f4 < 0 \tag{3'}$$

The image pickup optical system of each embodiment further satisfies the following formula (4), which is preferable.

$$-0.9 < f3/f4 < -0.1 \tag{4}$$

Where, f3 denotes the focal length of the third lens group, and f4 denotes the focal length of the fourth lens group.

The formula (4) is a formula for appropriately defining the ratio between the power of the fourth lens group and the power of the third lens group. When the value of f3/f4 is more than the lower limit, the negative power of the fourth lens group is not too strong. It suppresses the occurrence of rotationally asymmetric aberration around the optical axis caused when configuring the fourth lens group with one lens and conducting the decentering of the fourth lens group for the shake compensation. Therefore, it secures an excellent anti-shake capacity. When the value of f4/f3 is lower than the upper limit, the power of the third lens group is not too strong. It suppresses the occurrence of the aberration in the third lens group. Particularly it reduces the occurrence of the spherical aberration, which is preferable.

It is more preferable that the image pickup optical system satisfies the following formula (4') instead of the formula (4).

$$-0.7 < f3/f4 < -0.2 \tag{4'}$$

Since the third lens group has a structure including an aspherical surface, it provides excellent aberration correction in a variable power range from the wide-angle end to the telephoto end. Further, when the lens having an aspherical surface is formed of a plastic material, the cost of the lens becomes low. Further, when the plastic aspherical surface lens is placed at the closest position to the image side in the third lens group, where a light flux with a relatively narrow diameter passes through, it prevents the error of the lens surface shape, particularly the shape change of the lens surface caused by temperature change, from affecting the image forming performance.

When the fifth lens group has positive power and is structured by one lens including an aspherical surface, aberrations can be corrected in excellent condition and the retracted lens length can be further shortened. Further, when the fifth lens group is structured by one plastic aspherical lens, the cost of the lens can be lowered. When moving the fifth lens group toward an object side for adjusting its focus to proximity-object, an excellent focusing performance can be secured.

In these embodiments, examples of digital cameras for picking-up a still image are described. However, an image pickup optical system of the present invention can be used in a digital video camera for shooting movie, a mobile computer, a cellular phone and a camera, which is installed into an information-processing device such as a portable information terminal.

EXAMPLES

The structure of the image pickup optical system included in the image pickup apparatus according to the present invention will be further concretely described, with referring to construction data and aberration diagrams. Examples 1 to 3, which will be described hereinafter, respectively correspond to the first to third embodiments described above. FIGS. 3 to 5, which respectively represent plans of the lens configurations corresponding to the first to third embodiments, show the lens configurations of Examples 1 to 3.

In the construction data of Tables 1 to 6, optical surfaces are numbered from the object side; each curvature radius of the optical surfaces is expressed by r; and each axial distance from each optical surface to the neighboring optical surface is expressed by d, whose values appear in respective columns from the top of the Tables, in the order from the objective side of the image pickup optical system. The values of the axial distance to be changed by zooming operation appears in the Tables in order of: the value at the wide-angle end; the value at a focal length in the middle between the wide-angle end and the telephoto end; and the value at the telephoto end, from the left to the right in the column. In these Tables, refractive indexes of lenses in the image pickup optical system are expressed by N and Abbe number of the lenses are expressed by ν, whose values appear in respective columns from the top of the Tables in the order from the object side of the image pickup optical system. The refractive indexes and the Abbe numbers are the values for the d-line. The refractive index and the Abbe number for the air are omitted here. An asterisk mark (*) following the surface number represents an aspherical surface. In each construction data of Tables 1 to 6, it is assumed that an image pickup element is placed at the rear side of the final surface. Additionally, the focal lengths (f) of the total image pickup optical system at the wide-angle end, middle focal length, and telephoto end; and the F-numbers (FNO) at the wide-angle end, middle focal length, and telephoto end appear in each Table. The unit for the focal length, the curvature radius and the axial distance is "mm".

An aspherical surface is defined by the following formula (5).

$$X(H) = C \times H^2 / (1 + (1 - \epsilon \times C^2 \times H^2)^{1/2}) + \Sigma Ak \times Hk \quad (5)$$

Where H denotes the height in the direction perpendicular to the optical axis, H(X) denotes a displacement in the direction of the optical axis at the height H where the height is measured from the surface vertex of an aspherical surface, C denotes paraxial curvature, $\epsilon$ denotes quadratic surface parameter, k denotes the order number of an aspherical surface, Ak denotes a k-th order aspherical surface coefficient and Hk denotes the k-th power of H. The data related to an aspherical surface will be shown in Tables 2, 4 and 6.

Figure 6:
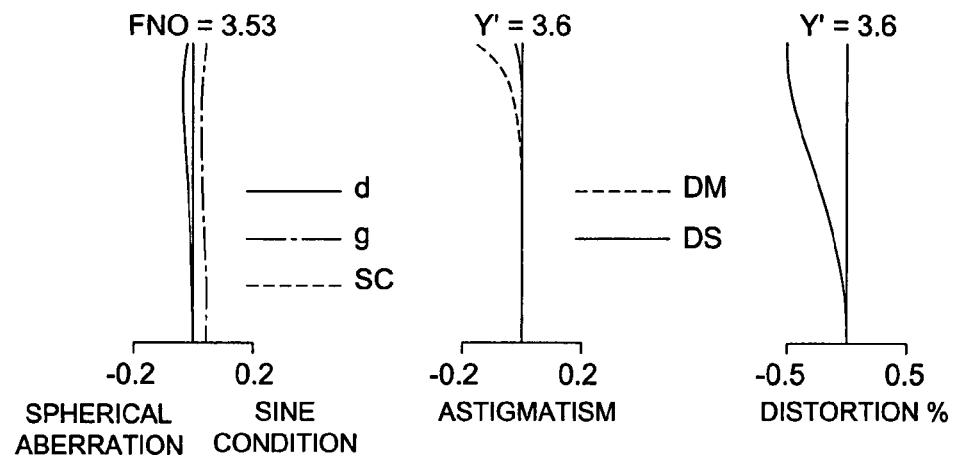
FIGS. 6(a)-6(c) illustrate diagrams showing aberrations of the image pickup optical system of the first embodiment at wide-angle end, middle focal length, and telephoto end, respectively.
Figure 6:
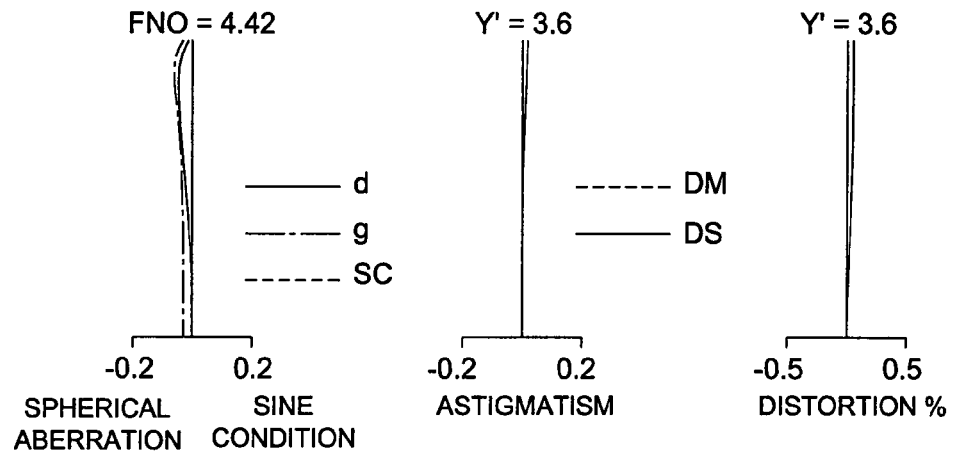
Figure 6:
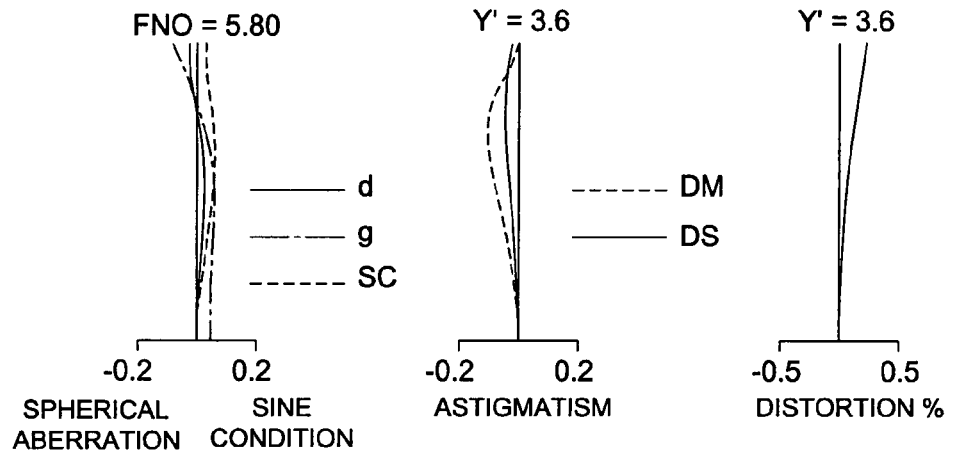
Figure 7:
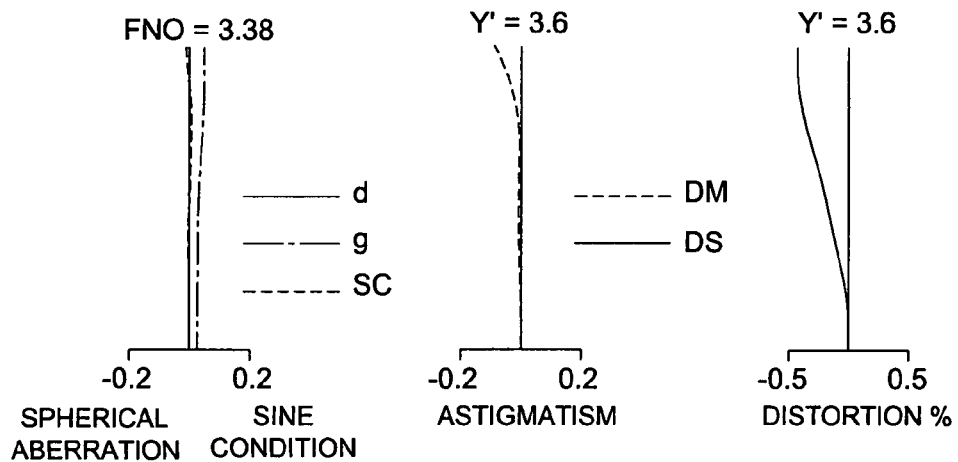
FIGS. 7(a)-7(c) illustrate diagrams showing aberrations of the image pickup optical system of the second embodiment at wide-angle end, middle focal length, and telephoto end, respectively.
Figure 7:
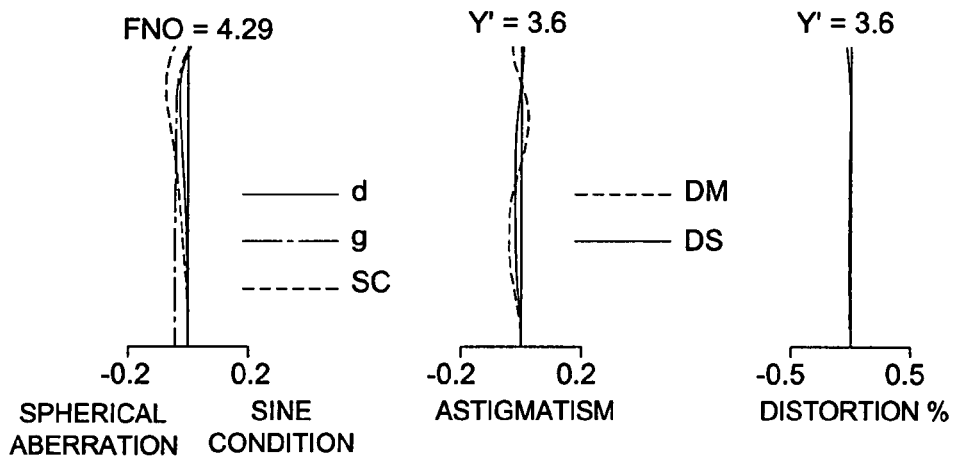
Figure 7:
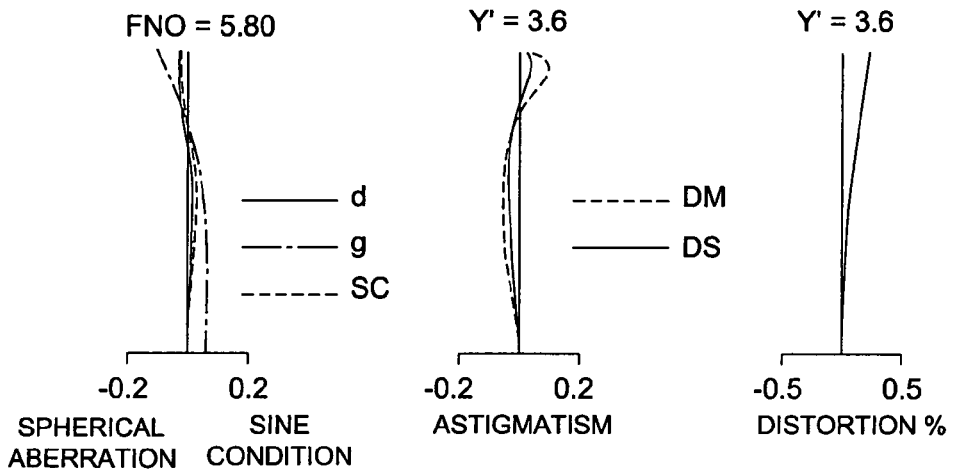
Figure 8:
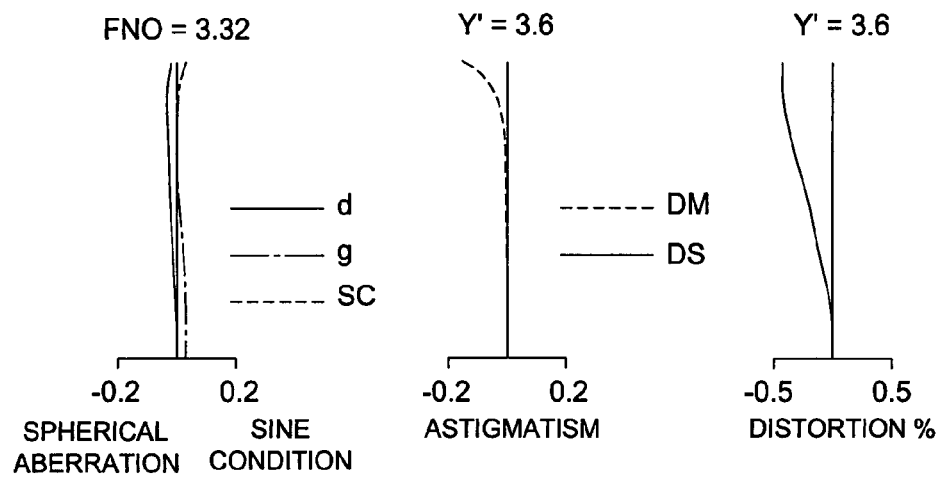
FIGS. 8(a)-8(c) illustrate diagrams showing aberrations of the image pickup optical system of the third embodiment at wide-angle end, middle focal length and telephoto end, respectively.
Figure 8:
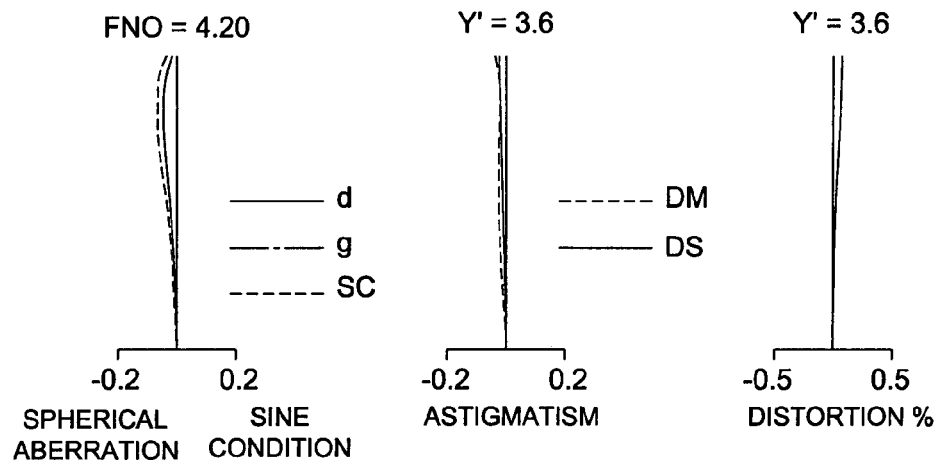
Figure 8:
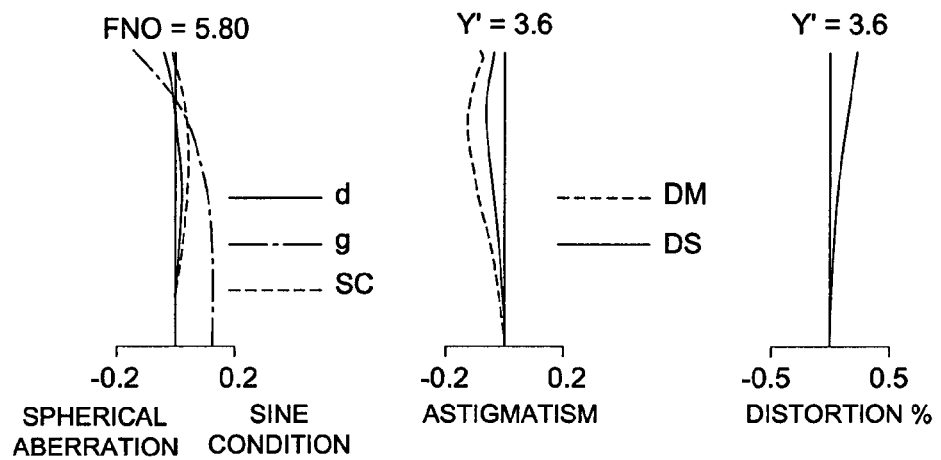
Figure 9:
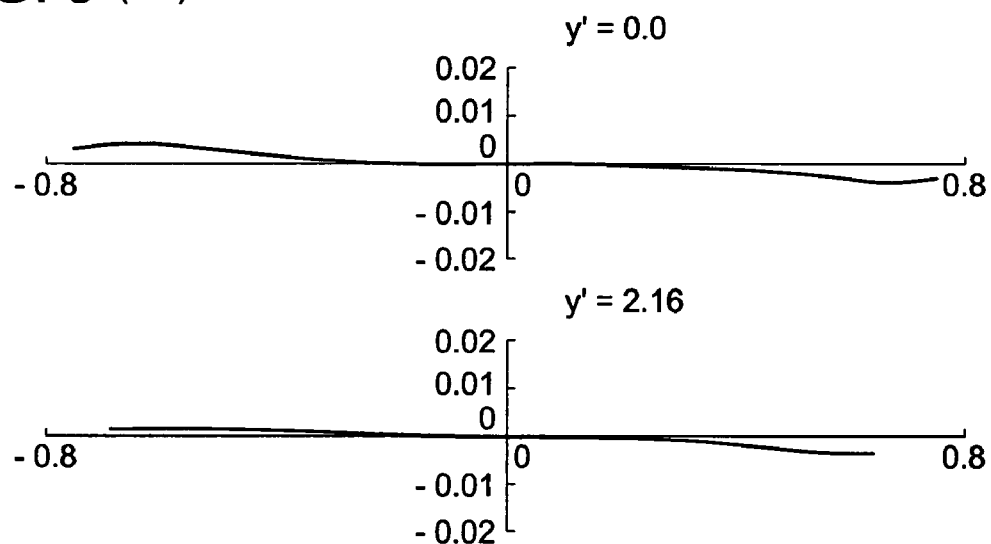
FIGS. 9(a) and 9(b) illustrate diagrams showing meridional transverse aberration of before and after conducting the decentering of the image pickup optical system of the first embodiment at wide-angle end, respectively.
Figure 9:
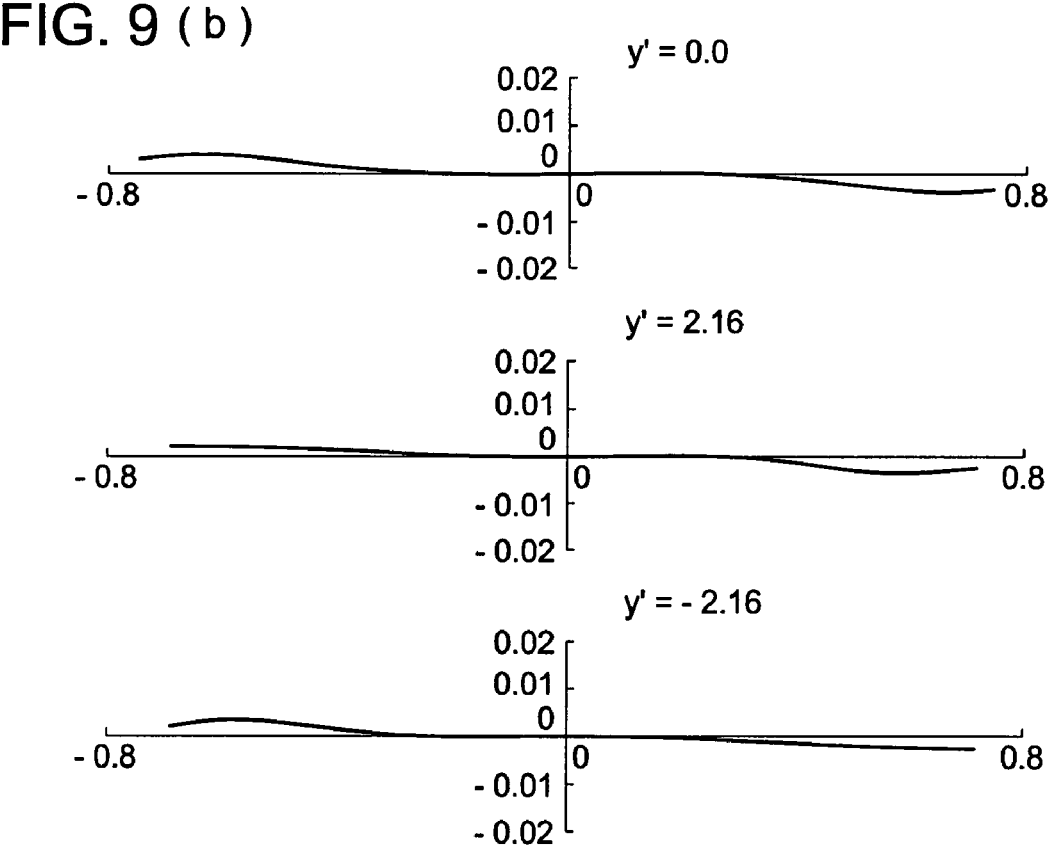
Figure 10:
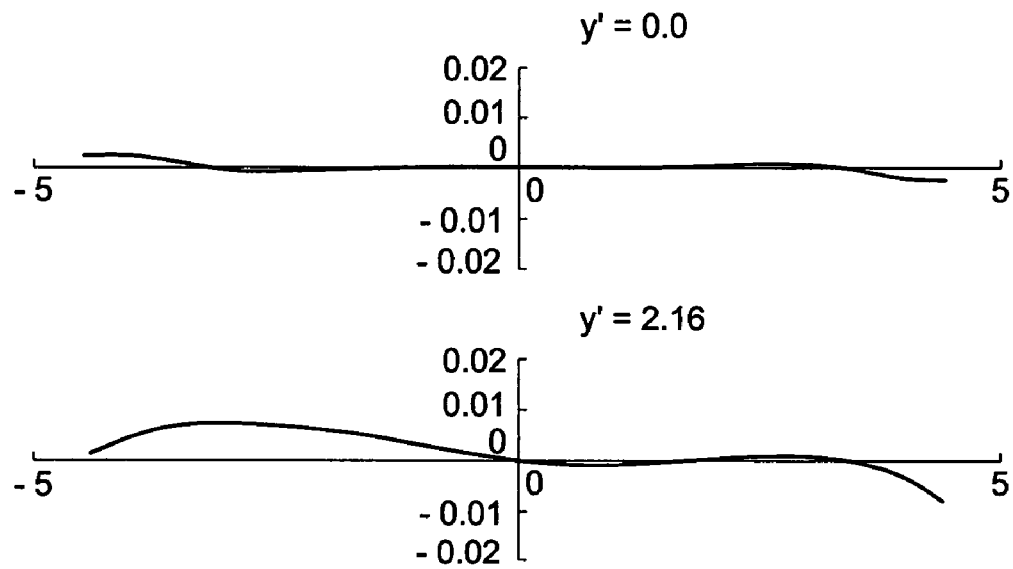
FIGS. 10(a) and 10(b) illustrate diagrams showing meridional transverse aberration of before and after conducting the decentering of the image pickup optical system of the first embodiment at telephoto end, respectively.
Figure 10:
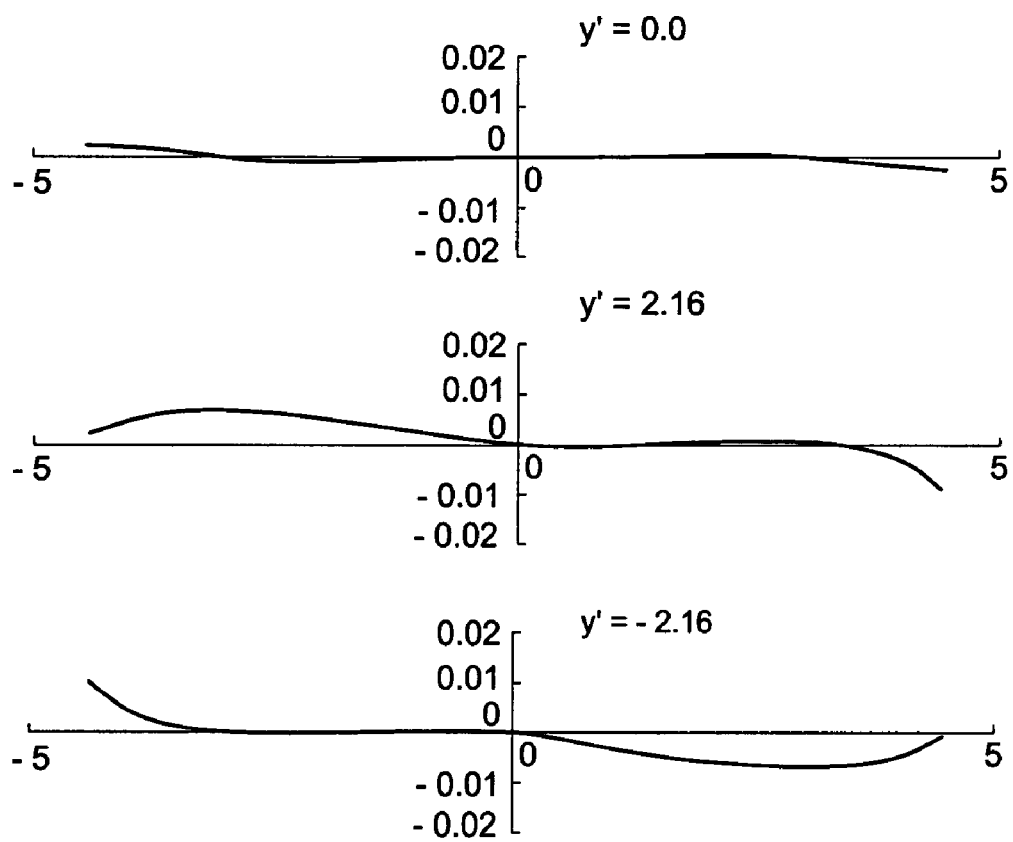
Figure 11:
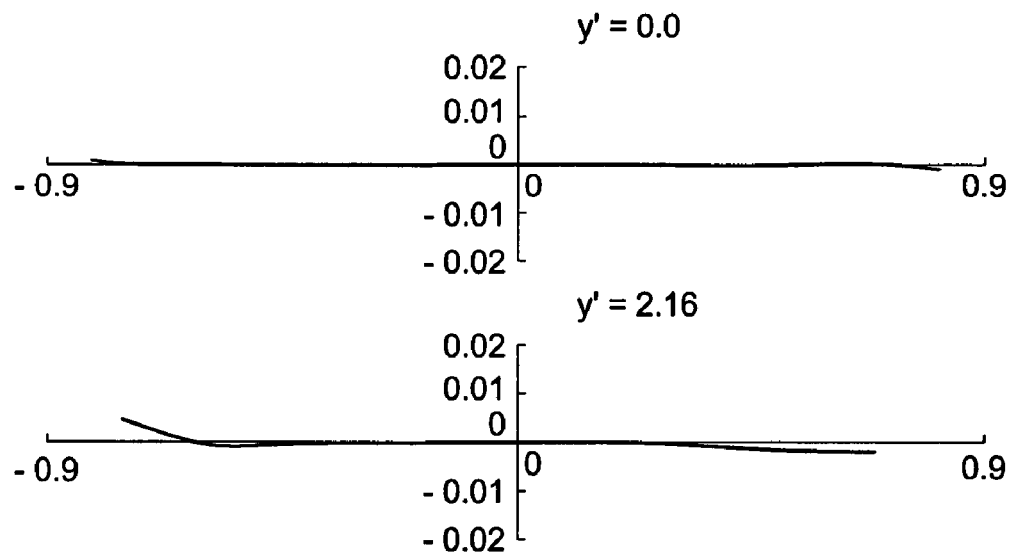
FIGS. 11(a) and 11(b) illustrate diagrams showing meridional transverse aberration of before and after conducting the decentering of the image pickup optical system of the second embodiment at wide-angle end, respectively.
Figure 11:
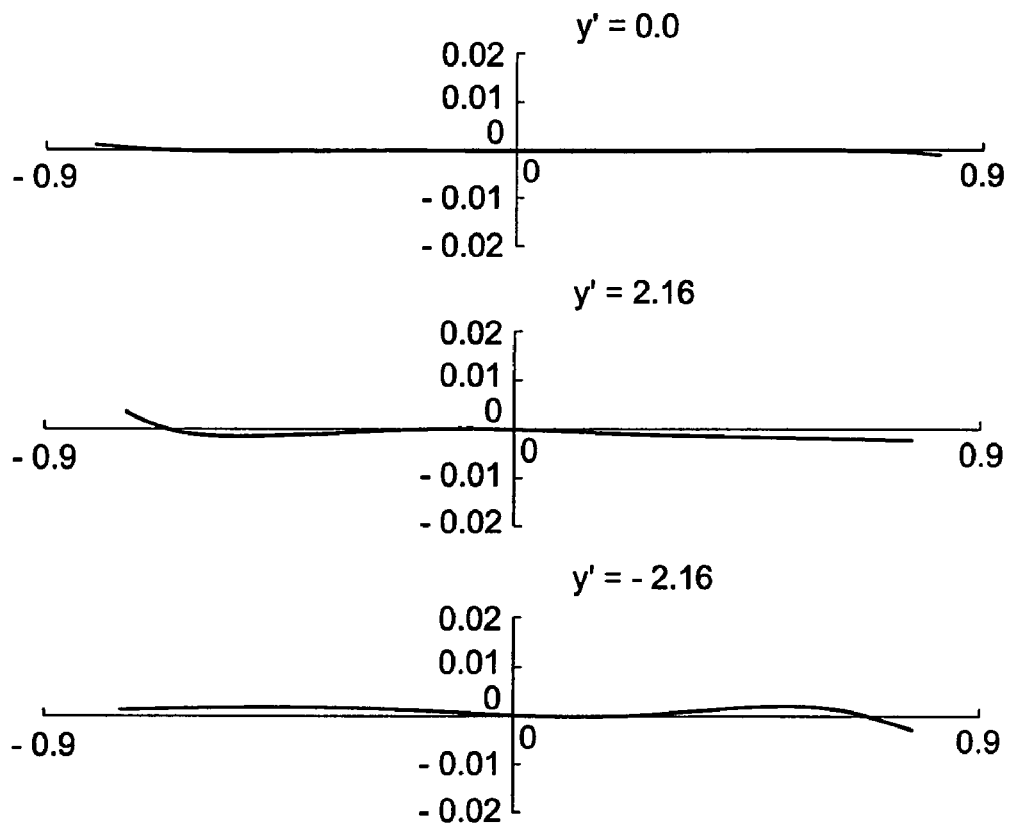
Figure 12:
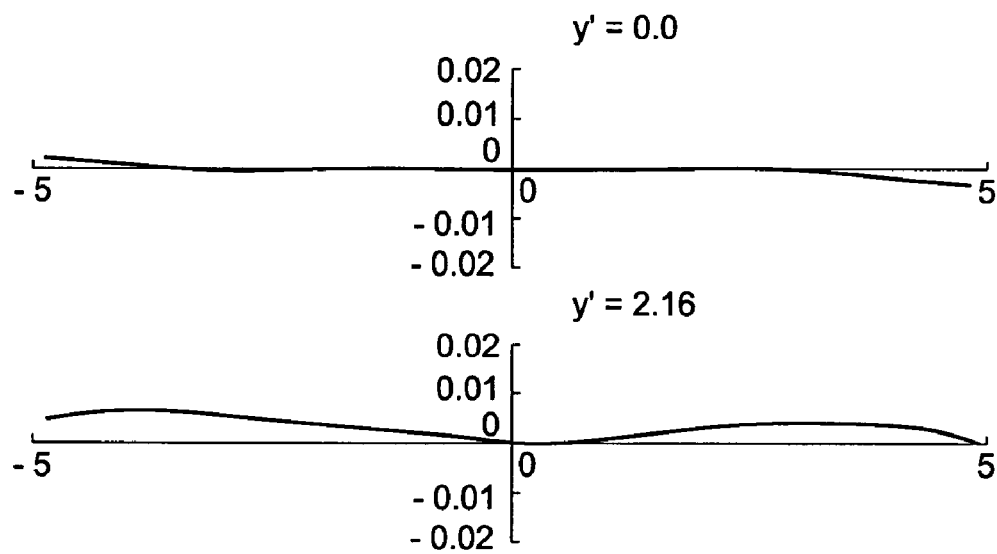
FIGS. 12(a) and 12(b) illustrate diagrams showing meridional transverse aberration of before and after conducting the decentering of the image pickup optical system of the second embodiment at telephoto end, respectively.
Figure 12:
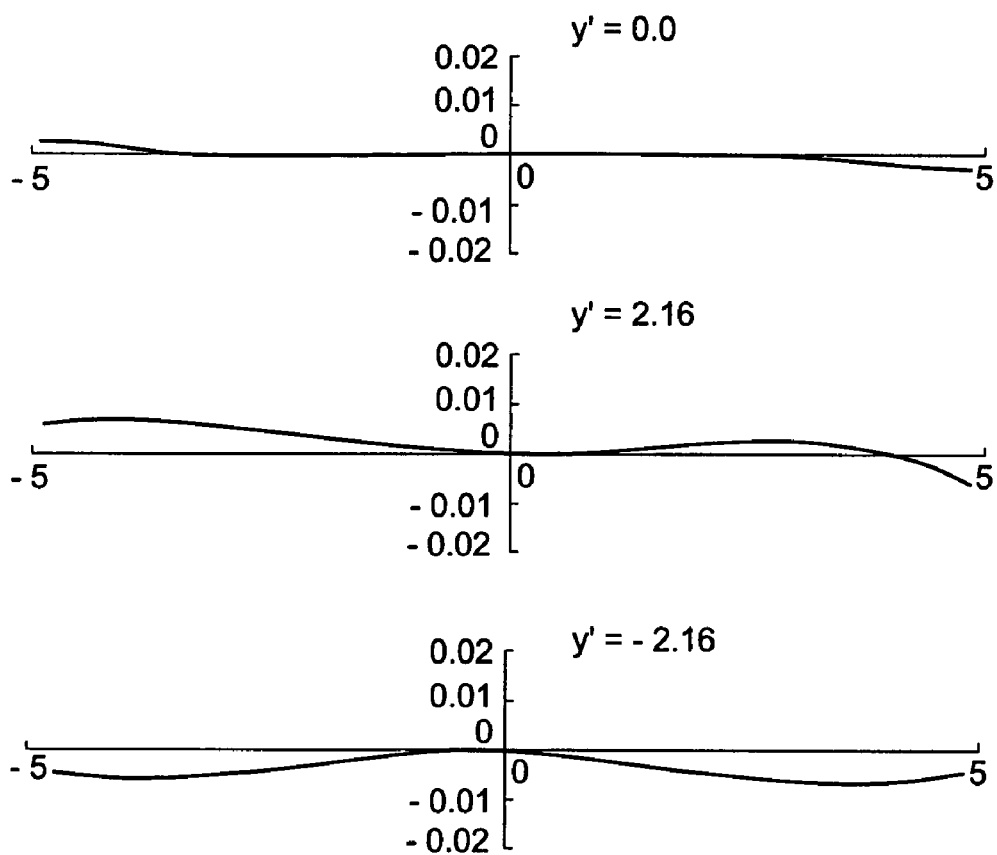
Figure 13:
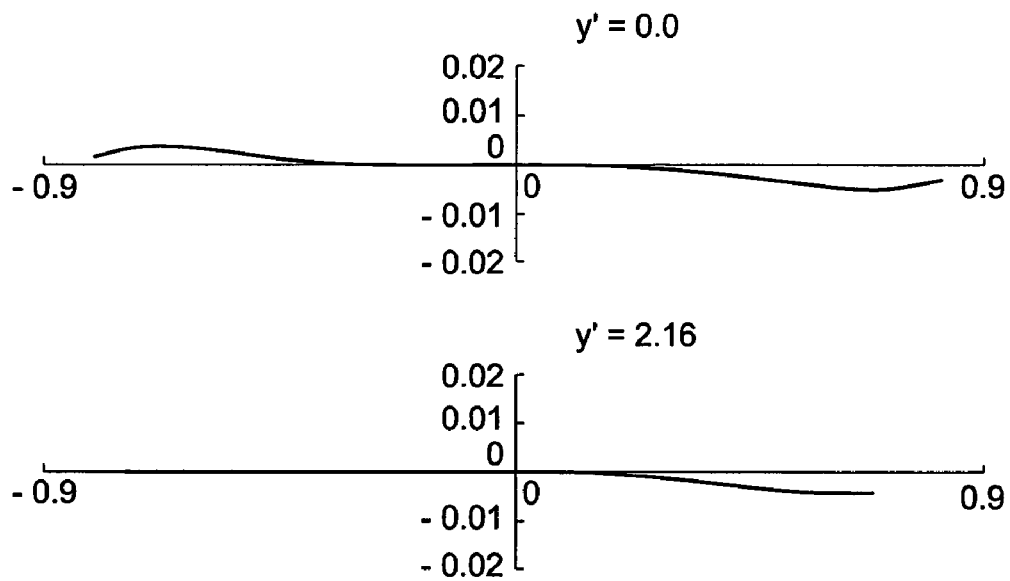
FIGS. 13(a) and 13(b) illustrate diagrams showing meridional transverse aberration of before and after conducting the decentering of the image pickup optical system of the third embodiment at wide-angle end, respectively.
Figure 13:
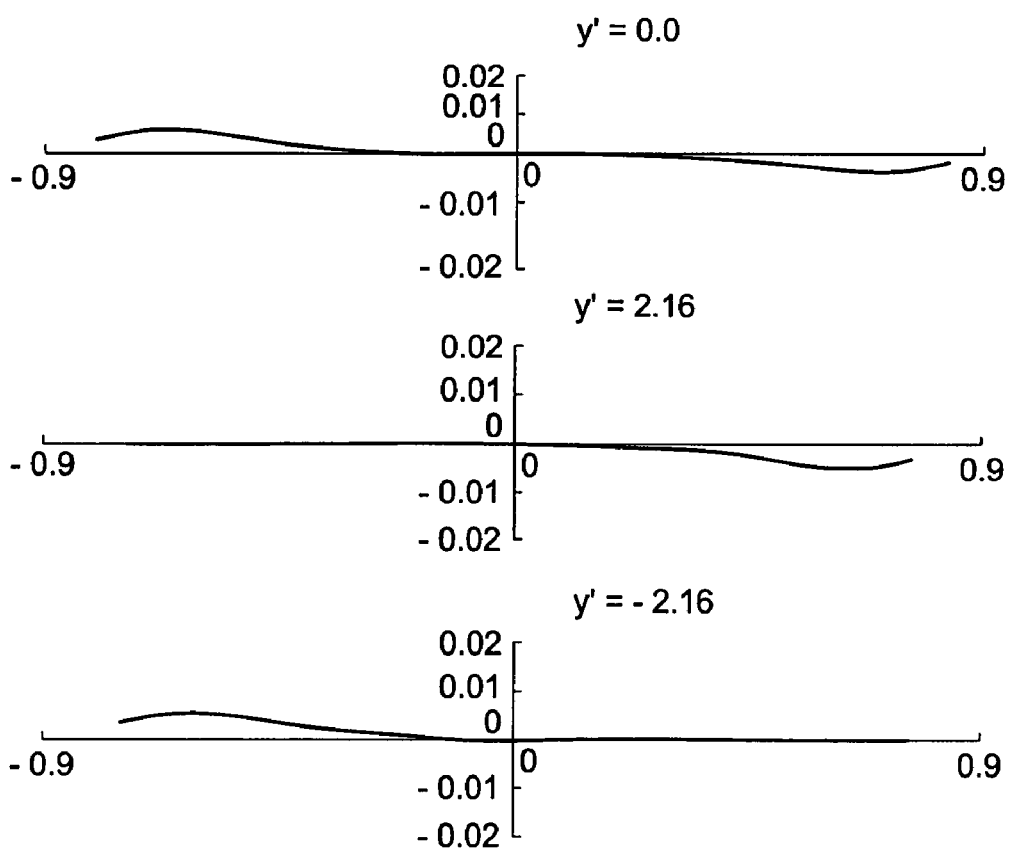
Figure 14:
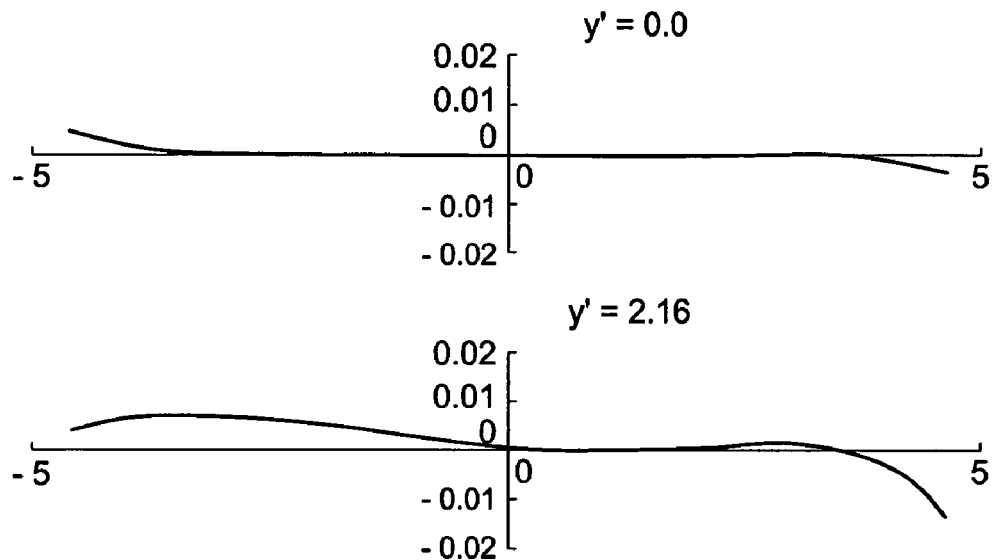
FIGS. 14(a) and 14(b) illustrate diagrams showing meridional transverse aberration of before and after conducting the decentering of the image pickup optical system of the third embodiment at telephoto end, respectively.
Figure 14:
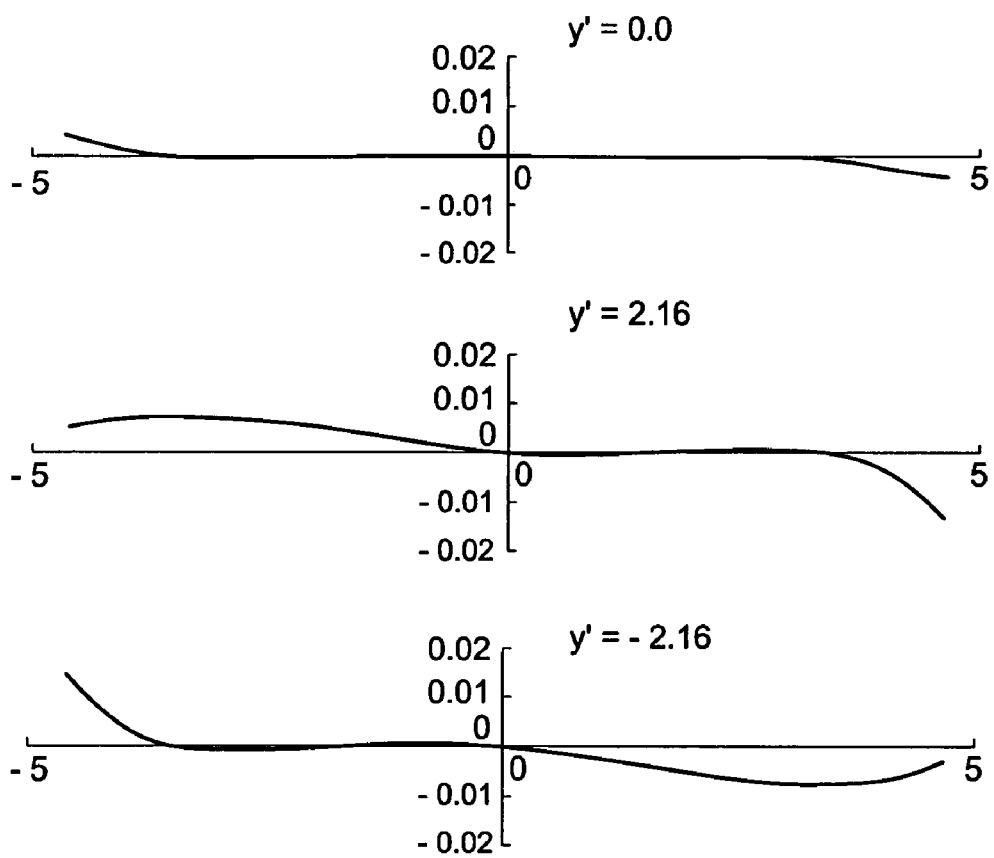

FIGS. 6(a) to 6(c), 7(a) to 7(c), and 8(a) to 8(c) illustrate aberration diagrams of Examples 1 to 3, each of which shows diagrams of aberrations: spherical aberration, astigmatism, and distortion in this order from the left hand side of the each figure. FIGS. 6(a), 7(a), and 8(a) show the aberrations at wide-angle end; FIGS. 6(b), 7(b), and 8(b) show the aberrations at middle focal length; and FIGS. 6(c), 7(c), and 8(c) show the aberrations at telephoto end. In the spherical aberration diagrams, lines d, g and SC respectively denote the aberration for d-line, the aberration for g-line and the amount of the offence against the sine condition. In the astigmatism diagrams, lines DM and DS respectively denote the aberration on the meridional plane and the aberration on the sagittal plane. The units for the lateral axis in the spherical aberration diagrams and the astigmatism distortion diagrams are "mm", and the unit for the lateral axis in the distortion diagrams is "%".

Here the vertical axis in the spherical aberration diagrams represents F number (FNO), and the vertical axis in the astigmatism diagrams and the distortion diagrams represents the maximum image height Y'.

FIGS. 9(a) to 14(a) and 9(b) to 14(b) illustrate lateral aberration diagrams corresponding to the wide-angle end and the telephoto end of the first to third examples. Each pair of FIGS. 9(a) and 10(a); 11(a) and 12(a); and 13(a) and 14(a) shows the lateral aberrations of the light flux on the meridional plane before conducting decentering of the lens group for the shake compensation, at the wide-angle end and the telephoto end of the first to third examples. Each of the figures includes the lateral aberration diagrams at the maximum image heights of y'=0.0 and y'=2.16. Each pair of FIGS. 9(b) and 10(b); 11(b) and 12(b); and 13(b) and 14(b) show the lateral aberrations of the light flux on the meridional plane after conducting decentering of the lens group for the shake compensation at the wide-angle end and the telephoto end of the first to third examples. Each of the figures includes the lateral aberration diagrams at the maximum image heights of y'=0.0, y'=2.16, and y'=−2.16. The lateral axis in the lateral aberration diagrams represents a ray position at the entrance pupil. The vertical axis of the lateral aberration diagrams represents lateral aberration. Each of the aberration diagrams after conducting decentering shows the aberration under the compensated condition at the shake compensation angle θ of the lens group for the shake compensation satisfying θ=0.1°.

In order to provide the shake compensation at the shake compensation angle θ=0.1°, the decentering amount of the lens for the shake compensation will be as follows.

In the Example 1, the decentering amount at the wide-angle end is −0.019 mm and the decentering amount at the telephoto end is −0.193 mm. With regard to the sign of the decentering amount, when the entire of image pickup optical system illustrated in FIG. 3 declines in counterclockwise, the lens for the shake compensation which shifts in the upper direction provides the decentering amount with a sign of + (plus), while, the lens for shake compensation which shifts in the lower direction provides the decentering amount with a sign of − (minus). In the Example 2, the decentering amount at the wide-angle end is −0.023 mm and the decentering amount at the telephoto end is −0.226 mm. In the Example 3, the decentering amount at the wide-angle end is −0.026 mm and the decentering amount at the telephoto end is −0.256 mm.

The value of each Examples corresponding to the conditional formulas will be shown in Table 7. Each example satisfies all conditional formulas.

Example 1

TABLE 1

$f = 5.30\text{-}16.75\text{-}52.97$
$FNO = 3.53\text{-}4.42\text{-}5.80$

| Surface number | Curvature radius (r) | Axial distance (d) | Refractive index (N) | Abbe number (ν) |
|---|---|---|---|---|
| 1 | 26.527 | | | |
| | | 0.9 | 1.84666 | 23.78 |
| 2 | 18.111 | | | |
| | | 0.336 | | |
| 3 | 18.701 | | | |
| | | 3.584 | 1.72916 | 54.67 |
| 4 | 164.597 | | | |
| | | 0.7-13.471-25.902 | | |
| 5 | 22.436 | | | |
| | | 0.7 | 1.88300 | 40.80 |
| 6 | 5.805 | | | |
| | | 3.756 | | |
| 7 | −21.211 | | | |
| | | 0.7 | 1.72916 | 54.67 |
| 8 | 17.272 | | | |
| | | 0.1 | | |
| 9 | 11.482 | | | |
| | | 1.629 | 1.92286 | 20.88 |
| 10 | 39.360 | | | |
| | | 19.793-6.005-0.78 | | |
| 11 | Diaphragm | | | |
| | | 0.8 | | |
| 12 | 6.381 | | | |
| | | 1.236 | 1.62004 | 36.30 |
| 13 | 8.986 | | | |
| | | 0.597 | | |
| 14 | 9.324 | | | |
| | | 1.058 | 1.76182 | 26.61 |
| 15 | 4.581 | | | |
| | | 1.957 | 1.62041 | 60.34 |
| 16 | −102.533 | | | |
| | | 0.1 | | |
| 17* | 7.770 | | | |
| | | 1 | 1.53048 | 55.72 |
| 18* | 7.928 | | | |
| | | 3.173-8.817-15.247 | | |
| 19 | −46468.400 | | | |
| | | 1 | 1.60700 | 27.00 |
| 20* | 12.191 | | | |
| | | 6.448-3.860-5.081 | | |
| 21 | 8.054 | | | |
| | | 2.137 | 1.53048 | 55.72 |
| 22* | 97.265 | | | |
| | | 1.631-4.219-2.999 | | |
| 23 | ∞ | | | |
| | | 1.5 | 1.51680 | 64.20 |
| 24 | ∞ | | | |

TABLE 2

Aspherical surface data r17

$\epsilon = 1.0000$
$A4 = 0.45124761 \times 10^{-5}$
$A6 = -0.68234929 \times 10^{-4}$
$A8 = -0.10835705 \times 10^{-5}$
$A10 = -0.19800958 \times 10^{-6}$ r18

$\epsilon = 1.0000$
$A4 = 0.10962148 \times 10^{-2}$
$A6 = -0.67970375 \times 10^{-4}$
$A8 = -0.18528020 \times 10^{-7}$
$A10 = -0.28705809 \times 10^{-6}$ TABLE 2-continued Aspherical surface data r20

$\epsilon = 1.0000$
$A4 = -0.40020783 \times 10^{-4}$
$A6 = 0.81207420 \times 10^{-5}$
$A8 = -0.84541484 \times 10^{-6}$
$A10 = 0.41331968 \times 10^{-7}$ r22

$\epsilon = 1.0000$
$A4 = 0.27996326 \times 10^{-3}$
$A6 = -0.49335459 \times 10^{-5}$
$A8 = 0.28869081 \times 10^{-6}$
$A10 = -0.89376603 \times 10^{-8}$ Example 2

TABLE 3

$f = 5.63\text{-}17.81\text{-}56.31$
$FNO = 3.38\text{-}4.30\text{-}5.80$

| Surface number | Curvature radius (r) | Axial distance (d) | Refractive index (N) | Abbe number (ν) |
|---|---|---|---|---|
| 1 | 25.861 | | | |
| | | 0.9 | 1.84666 | 23.78 |
| 2 | 17.284 | | | |
| | | 0.31 | | |
| 3 | 17.791 | | | |
| | | 3.27 | 1.72916 | 54.67 |
| 4 | 364.055 | | | |
| | | 0.7-11.058-22.026 | | |
| 5 | 33.052 | | | |
| | | 0.70 | 1.88300 | 40.80 |
| 6 | 5.948 | | | |
| | | 3.42 | | |
| 7 | −17.231 | | | |
| | | 0.70 | 1.72916 | 54.67 |
| 8 | 24.166 | | | |
| | | 0.10 | | |
| 9 | 13.556 | | | |
| | | 1.57 | 1.92286 | 20.88 |
| 10 | 90.240 | | | |
| | | 20.269-5.804-0.743 | | |
| 11 | Diaphragm | | | |
| | | 0.80 | | |
| 12 | 163.463 | | | |
| | | 1.21 | 1.77250 | 49.62 |
| 13 | −27.139 | | | |
| | | 0.10 | | |
| 14 | 5.753 | | | |
| | | 2.31 | 1.49700 | 81.61 |
| 15 | −18.502 | | | |
| | | 1.07 | | |
| 16 | −12.169 | | | |
| | | 0.70 | 1.80610 | 33.27 |
| 17 | 18.601 | | | |
| | | 0.79 | | |
| 18* | 15.475 | | | |
| | | 1.18 | 1.53048 | 55.72 |
| 19* | 415.540 | | | |
| | | 1.455-8.054-15.87 | | |
| 20* | 14.452 | | | |
| | | 0.70 | 1.60280 | 28.30 |
| 21* | 7.049 | | | |
| | | 7.701-3.587-5.454 | | |
| 22* | 8.030 | | | |
| | | 2.04 | 1.53048 | 55.72 |
| 23* | 43.972 | | | |
| | | 1.51-5.625-3.758 | | |
| 24 | ∞ | | | |
| | | 1.50 | 1.51680 | 64.20 |
| 25 | ∞ | | | |

TABLE 4

Aspherical surface data r18

$\epsilon$ = 1.0000
A4 = 0.90966309 × 10$^{-3}$
A6 = 0.60666976 × 10$^{-4}$
A8 = 0.12490337 × 10$^{-5}$
A10 = −0.15045257 × 10$^{-6}$ r19

$\epsilon$ = 1.0000
A4 = 0.20248919 × 10$^{-2}$
A6 = 0.88912861 × 10$^{-4}$
A8 = 0.41265896 × 10$^{-5}$
A10 = −0.13462864 × 10$^{-6}$ r20

$\epsilon$ = 1.0000
A4 = −0.22018853 × 10$^{-2}$
A6 = 0.75736074 × 10$^{-4}$
A8 = 0.52627791 × 10$^{-5}$
A10 = −0.18486094 × 10$^{-6}$ r21

$\epsilon$ = 1.0000
A4 = −0.27606143 × 10$^{-2}$
A6 = 0.11129109 × 10$^{-3}$
A8 = 0.19398945 × 10$^{-5}$
A10 = −0.23516025 × 10$^{-7}$ r22

$\epsilon$ = 1.0000
A4 = −0.42207435 × 10$^{-3}$
A6 = −0.67483850 × 10$^{-7}$
A8 = −0.10061393 × 10$^{-5}$
A10 = −0.50608301 × 10$^{-7}$ r23

$\epsilon$ = 1.0000
A4 = −0.37432804 × 10$^{-3}$
A6 = 0.34635313 × 10$^{-4}$
A8 = −0.47254150 × 10$^{-5}$
A10 = 0.63429667 × 10$^{-7}$

Example 3

TABLE 5 f = 5.33-16.84-53.24
FNO = 3.33-4.20-5.80

| Surface number | Curvature radius (r) | Axial distance (d) | Refractive index (N) | Abbe number (ν) |
|---|---|---|---|---|
| 1 | 28.512 | | | |
| | | 0.90 | 1.84666 | 23.78 |
| 2 | 19.079 | | | |
| | | 0.33 | | |
| 3 | 19.677 | | | |
| | | 3.61 | 1.72916 | 54.67 |
| 4 | 273.735 | | | |
| | | 0.7-14.442-25.764 | | |
| 5 | 22.255 | | | |
| | | 0.70 | 1.88300 | 40.80 |
| 6 | 5.836 | | | |
| | | 3.99 | | |
| 7 | −17.560 | | | |
| | | 0.70 | 1.49700 | 81.61 |
| 8 | 13.717 | | | |
| | | 0.10 | | |
| 9 | 10.137 | | | |
| | | 1.56 | 1.92286 | 20.88 |
| 10 | 20.310 | | | |
| | | 18.878-6.223-0.866 | | |

TABLE 5-continued f = 5.33-16.84-53.24
FNO = 3.33-4.20-5.80

| Surface number | Curvature radius (r) | Axial distance (d) | Refractive index (N) | Abbe number (ν) |
|---|---|---|---|---|
| 11 | Diaphragm | | | |
| | | 0.80 | | |
| 12 | 6.673 | | | |
| | | 1.44 | 1.72825 | 28.32 |
| 13 | 17.025 | | | |
| | | 0.59 | | |
| 14 | 15.853 | | | |
| | | 0.70 | 1.80518 | 25.46 |
| 15 | 4.376 | | | |
| | | 1.95 | 1.62041 | 60.34 |
| 16 | −80.486 | | | |
| | | 0.10 | | |
| 17* | 7.085 | | | |
| | | 1.00 | 1.53048 | 55.72 |
| 18* | 7.049 | | | |
| | | 2.279-7.995-16.242 | | |
| 19 | 128.215 | | | |
| | | 1.00 | 1.60700 | 27.00 |
| 20* | 14.995 | | | |
| | | 6.978-4.342-5.424 | | |
| 21 | 8.031 | | | |
| | | 2.01 | 1.53048 | 55.72 |
| 22* | 38.093 | | | |
| | | 1.733-4.369-3.289 | | |
| 23 | ∞ | | | |
| | | 1.50 | 1.51680 | 64.20 |
| 24 | ∞ | | | |

TABLE 6

Aspherical surface data r17

$\epsilon$ = 1.0000
A4 = −0.20145827 × 10$^{-3}$
A6 = −0.50685862 × 10$^{-4}$
A8 = −0.39252682 × 10$^{-5}$
A10 = −0.52465031 × 10$^{-7}$ r18

$\epsilon$ = 1.0000
A4 = 0.73453181 × 10$^{-3}$
A6 = −0.41199495 × 10$^{-4}$
A8 = −0.53825216 × 10$^{-5}$
A10 = 0.44423610 × 10$^{-8}$ r20

$\epsilon$ = 1.0000
A4 = −0.35187027 × 10$^{-4}$
A6 = 0.92366712 × 10$^{-5}$
A8 = −0.10253730 × 10$^{-5}$
A10 = 0.42962884 × 10$^{-7}$ r22

$\epsilon$ = 1.0000
A4 = 0.21467362 × 10$^{-3}$
A6 = −0.49782625 × 10$^{-6}$
A8 = 0.98034716 × 10$^{-7}$
A10 = −0.49476757 × 10$^{-8}$

TABLE 7

Values corresponding to conditional formulas

| | f1/fw | f4/ft | (N'-N) × (X(H) − X0(H))/f4 | f3/f4 |
|---|---|---|---|---|
| Example 1 | 9.297 | −0.379 | −4.96E−07 | −0.537 |
| Example 2 | 7.664 | −0.42 | −4.63E−05 | −0.476 |
| Example 3 | 9.326 | −0.527 | −3.74E−07 | −0.388 |

Character "E" denotes an exponent portion of the corresponding number.

What is claimed is:

1. An image pickup optical system for forming a light flux from an object into an optical image on an image pickup element, the image pickup optical system comprising, in order from an object side thereof:
   a first lens group having a positive power;
   a second lens group having a negative power;
   a third lens group having a positive power;
   a fourth lens group having a negative power; and
   a fifth lens group,
   wherein a distance between each neighboring lens groups among the first to fifth lens groups changes with the fourth lens group positioned at a fixed distance to an image surface of the image pickup optical system, for varying power of the image pickup optical system from a wide-angle end to a telephoto end,
   the fourth lens group moves in a direction substantially perpendicular to an optical axis for a shake compensation, and
   the image pickup optical system fulfills following conditional formulas:

$6 < f1/fw < 20$, and $-0.7 < f4/ft < -0.2$, where f1 is a focal length of the first lens group,
   fw is a focal length of the image pickup optical system at the wide-angle end,
   f4 is a focal length of the fourth lens group, and
   ft is a focal length of the image pickup optical system at the telephoto end.

2. The image pickup optical system of claim 1,
   wherein the fourth lens group consists of one lens including at least one aspherical surface, and
   the fourth lens group fulfills a following conditional formula:

$-1 \times 10^{-2} < (N'-N) \times (X(H)-X0(H))/f4 < 0$, where N is a refractive index of a material at an object side of the aspherical surface for d line,
   N' is a refractive index of a material at an image side of the aspherical surface for d line,
   H is a height at which an axial marginal ray passes through on the aspherical surface at the telephoto end,
   X(H) is a displacement of the aspherical surface along the optical axis at the height H,
   X0(H) is a displacement of a reference spherical surface of the aspherical surface along the optical axis at the height H, the reference surface representing a spherical surface having a same paraxial curvature-radius to the aspherical surface, and
   the displacement in a direction to the image surface is represented by a positive value.

3. The image pickup optical system of claim 1,
   wherein the image pickup optical system fulfills a following conditional formula:

$-0.9 < f3/f4 < -0.1$, where f3 is a focal length of the third lens group, and
   f4 is a focal length of the fourth lens group.

4. The image pickup optical system of claim 1,
   wherein the third lens group comprises a plurality of lenses including a lens closest to the image which includes an aspherical surface.

5. The image pickup optical system of claim 1,
   wherein the fifth lens group has a positive power and consists of one lens including at least an aspherical surface.

6. An image pickup apparatus comprising:
   the image pickup optical system of claim 1; and
   an image pickup element for receiving a light flux guided by the image pickup optical system.

* * * * *